(12) United States Patent
Wu et al.

(10) Patent No.: US 8,932,747 B2
(45) Date of Patent: Jan. 13, 2015

(54) LITHIUM BATTERY AND ELECTRODE PLATE STRUCTURE

(75) Inventors: Ping-Yao Wu, Hsinchu County (TW); Wen-Bing Chu, Hsinchu (TW); Chang-Rung Yang, Hsinchu (TW); Jen-Jeh Lee, Taipei (TW); Jing-Pin Pan, Hsinchu County (TW); Jung-Mu Hsu, Penghu County (TW); Shu-Heng Wen, Hsinchu County (TW); Hung-Chun Wu, Hsinchu County (TW); Chung-Liang Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 266 days.

(21) Appl. No.: 13/216,239

(22) Filed: Aug. 24, 2011

(65) Prior Publication Data
US 2012/0164512 A1   Jun. 28, 2012

(30) Foreign Application Priority Data
Dec. 23, 2010   (TW) ............................... 99145569 A

(51) Int. Cl.
| H01M 2/18 | (2006.01) |
|---|---|
| H01M 2/16 | (2006.01) |
| H01M 4/02 | (2006.01) |
| H01M 4/13 | (2010.01) |
| H01M 4/00 | (2006.01) |
| H01M 4/50 | (2010.01) |
| H01M 10/052 | (2010.01) |
| H01M 4/131 | (2010.01) |
| H01M 4/62 | (2006.01) |
| H01M 10/0585 | (2010.01) |
| H01M 4/505 | (2010.01) |
| H01M 4/525 | (2010.01) |
| H01M 4/58 | (2010.01) |

(52) U.S. Cl.
CPC ............ *H01M 10/052* (2013.01); *H01M 4/131* (2013.01); *H01M 4/622* (2013.01); *H01M 10/0585* (2013.01); *H01M 4/505* (2013.01); *H01M 4/525* (2013.01); *H01M 4/5825* (2013.01); *Y02E 60/122* (2013.01)
USPC ........... 429/144; 429/141; 429/209; 429/223; 429/221; 429/224

(58) Field of Classification Search
None
See application file for complete search history.

(56) References Cited

U.S. PATENT DOCUMENTS

| 2006/0099495 A1 | 5/2006 | Suzuki et al. |
|---|---|---|
| 2007/0026312 A1 * | 2/2007 | Imachi et al. ................. 429/217 |

(Continued)

FOREIGN PATENT DOCUMENTS

| CN | 1905247 | 1/2007 |
|---|---|---|
| CN | 101807724 | 8/2010 |

(Continued)

OTHER PUBLICATIONS

N. Imachi et al., "Layered Cathode for Improving Safety of Li-Ion Batteries", Journal of the Electrochemical Society, 154(5) A412-A416, 2007, p. A412-p. A416.

(Continued)

*Primary Examiner* — Ula C. Ruddock
*Assistant Examiner* — Daniel Gatewood
(74) *Attorney, Agent, or Firm* — Jianq Chyun IP Office

(57) ABSTRACT

A lithium battery is provided. The lithium battery comprises a first plate, a second plate and a separator. The first plate is composed of a plurality of electrode material layers stacked on one another. At least one of the electrode material layers comprises a thermal activation material. The separator is disposed between the first plate and the second plate.

16 Claims, 2 Drawing Sheets

(56) References Cited

U.S. PATENT DOCUMENTS

2009/0301866 A1  12/2009  Zaghib et al.
2010/0167129 A1* 7/2010  Wu et al. .................. 429/231.95

FOREIGN PATENT DOCUMENTS

| | | |
|---|---|---|
| CN | 101986452 | 3/2011 |
| JP | 2001-332245 | 11/2001 |
| JP | 2007-258086 | 10/2007 |
| JP | 2008-034215 | 2/2008 |
| JP | 2008-204886 | 9/2008 |
| JP | 2008-293875 | 12/2008 |
| JP | 2009-064574 | 3/2009 |
| JP | 2009-176540 | 8/2009 |
| JP | 2010-157512 | 7/2010 |
| JP | 2011-029079 | 2/2011 |
| TW | 201025697 | 7/2010 |

OTHER PUBLICATIONS

X.M. Feng et al., "A Positive-temperature-coefficient electrode with thermal cut-off mechanism for use in rechargeable lithium batteries", Electrochemistry Communications 6, 2004, p. 1021-p. 1024.

K.W. Leitner et al., "Layer by layer preparation of electrodes with defined thickness by multiple use of the SIC coating process", Journal of Power Sources 146, 2005, p. 209-p. 212.

"Office Action of Japan Counterpart Application", issued on Sep. 3, 2013, p. 1-p. 5.

"Office Action of Taiwan Counterpart Application", issued on Jun. 7, 2013, p. 1-p. 6.

"Office Action of China Counterpart Application", issued on Sep. 3, 2013, p. 1-p. 7.

"Second Office Action of China Counterpart Application", issued on Apr. 16, 2014, p. 1-p. 7.

* cited by examiner

US 8,932,747 B2

LITHIUM BATTERY AND ELECTRODE PLATE STRUCTURE

CROSS-REFERENCE TO RELATED APPLICATION

This application claims the priority benefit of Taiwan application serial no. 99145569, filed on Dec. 23, 2010. The entirety of the above-mentioned patent application is hereby incorporated by reference herein and made a part of specification.

BACKGROUND OF THE INVENTION

1. Field of the Invention

The application relates to a battery, and particularly to a lithium battery.

2. Description of Related Art

Since one-time used battery does not full fill the requirement of the environmental protection, the battery system capable of being recharged is getting a lot of interests. With the rapid development and popularization of the portable electronic products, the lithium batteries which can repeat the cycle of discharging-and-recharging have the advantages of light weight, high voltage and high energy density so that the market demands on the lithium batteries increase. Comparing with the nickel-metal-hydride battery, the nickel-zinc battery and the nickel-cadmium battery, the lithium battery has the advantages of high working voltage, large energy density, light weight, long lifetime and good environmental protection and the lithium battery is one of the best batteries for being applied in the flexible battery in the future.

The lithium batteries are widely used in the so-called 3C products including computers (i.e. the information products), the communication products and the consumer electronics so that the demands on the performance of the lithium batteries, such as light weight, durability, high voltage, high energy density and safety, become high. Further, the developmental potential and the application of the lithium batteries in the light-weighted electromobile industry, electric motor car industry and large-sized electronic storage industry are high. However, the organic solvents (most of these organic solvents include the organic molecules having ester groups) with high-voltage endurance which is used in the lithium battery system is flammable. Also, the positive electrode/negative electrode activity substance with high capacitance would decompose to generate a great amount of heat while the temperature of the battery increases so that the heat generated while the lithium battery is not properly used can ignite the organic solvent and even lead to the explosion. Moreover, during the discharge process of the lithium battery, since the oxygen is expelled from the positive electrode material structure, the expelled oxygen reacts with the electrolyte, which leads to the increasing of the internal temperature and induces safety problem of the lithium battery.

SUMMARY OF THE APPLICATION

The application provides a lithium battery capable of decreasing the conductivity while the temperature of the lithium battery increases.

The application provides a positive electrode plate structure capable of enhancing the safety for using the lithium battery.

The application provides a lithium battery comprising a first plate, a second plate, a separator and an electrolyte. The first plate is formed by a plurality of first electrode material layers stacked on one another, wherein at least one of the first electrode material layers comprises a thermal activation material. The separator is located between the first plate and the second plate.

The application further provides an electrode plate structure comprising a plurality of electrode material layers stacked on one another, wherein at least one of the first electrode material layers comprises a thermal activation material.

In order to make the aforementioned and other features and advantages of the present application more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
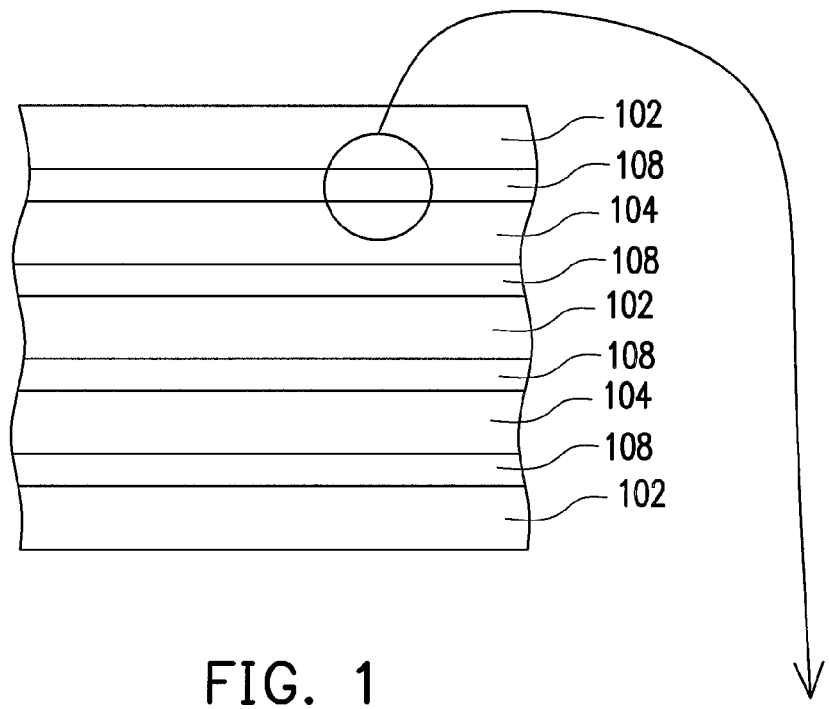
FIG. 1 is a schematic cross-sectional view of a portion of a lithium battery according to one embodiment of the present application.

FIG. 1 is a schematic cross-sectional view of a portion of a lithium battery according to one embodiment of the present application. As shown in FIG. 1, a lithium battery 100 of the present embodiment comprises several first plates 102, several second plates 104, several separators 108 and an electrolyte 110. The first plates 102 and the second plates 104 are alternatively arranged and are stacked on one another. Further, for a pair of one first plate 102 and one second plate 104, there is one separator 108 disposed between the first plate 102 and the second plate 104. Each of the separators 108 can be formed of, for example but not limited to, a porous structure and the porosity of the porous structure is about 40~55%. Moreover, the holes of the porous structure uniformly distribute in the whole separator 108. The first plates 102, the separators 108, the second plates 104 which are stacked on one another are soaked in the electrolyte 110. On other words, the whole body of the battery is flood with the electrolyte 110.

The first plate 102 is disposed to be opposite to the second plate 104. The separator 108 is disposed between the first plate 102 and the second plate 104. It should be noticed that the first plate 102, the second plate 104 and the separator 108 are soaked in the electrolyte 110. That is, the space between the first plate 102, the second plate 104 and the separator 108 are flooded with the electrolyte 110. More specifically, the holes 114 of the separator 108 are flooded with the electrolyte 110. Moreover, when the first plates 102 are the positive electrode plates, the second plates 104 are the negative electrode plates. On the contrary, when the first plates 102 are the negative electrode plates, the second plates 104 are the positive electrode plates.

Figure 1A:
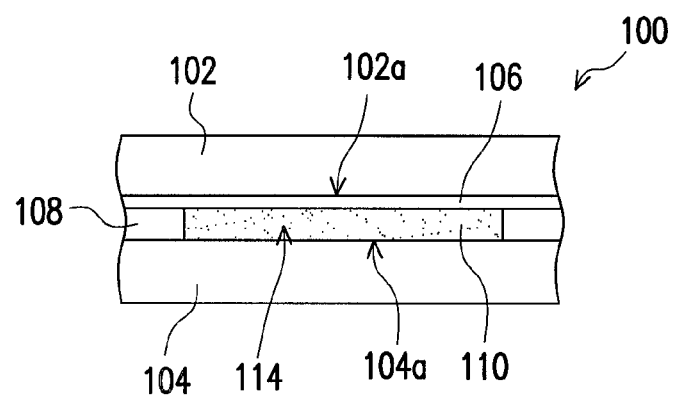
FIG. 1A is a partial enlargement view of the cross-section of the lithium battery shown FIG. 1.

FIG. 1A is a partial enlargement view of the cross-section of the lithium battery shown FIG. 1. As shown in FIG. 1, the first plate 102 of the lithium battery 100 of the present embodiment is a positive electrode plate and the second plate 104 of the lithium battery 100 of the present embodiment is an negative electrode plate. The material of the negative electrode plates includes carbide and lithium alloy. The carbide can be selected from a group comprised of carbon powder, graphite, carbon fiber, carbon nanotubes and the combination thereof. In one embodiment of the present application, the carbide is carbon powder and the particle diameter of the carbon powder is about 1~30 microns. In another embodiment, the material of the negative electrode plates 104 includes metal, such as LiAl, LiZn, $Li_3Bi$, $Li_3Cd$, $Li_3Sb$, $Li_4Si$, $Li_{4.4}Pb$, $Li_{4.4}Sn$, $LiC_6$, $Li_3FeN_2$, $Li_{2.6}Co_{0.4}N$, $Li_{2.6}Cu_{0.4}N$ and the combination thereof. Moreover, In another embodiment, the negative electrode plates 104 include metal-containing oxide, such as SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO, FeO, $TiO_2$, $Li_3Ti_5O_{12}$ or the combination thereof.

The separator 108 includes insulating material such as polyethylene (PE), polypropylene (PP) or the multi-layered complex structure thereof such as PE/PP/PE. The main composition of the electrolyte 110 includes organic solvent, lithium salt and additive. The organic solvent can be, for example, γ-butyrolactone (GBL), ethylene carbonate (EC), propylene carbonate (PC), diethyl carbonate (DEC), propyl acetate (PA), dimethyl carbonate (DMC), ethylmethyl carbonate (EMC) or the combination thereof. The lithium salt can be, for example, $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$, $LiCF_3SO_3$, $LiB(C_2O_4)_2$ or the combination thereof.

The positive electrode plate 102 can be formed by a plurality of electrode material layers (such as electrode material layer 102a, 102b, 102c and 102d) which are stacked one another. The positive electrode plate 102 having a plurality of electrode material layer stacked one another can be formed by slot die coating, slide coating or curtain coating. Moreover, each of the electrode material layers is made of a conductive material and at least one of the electrode material layers comprises a thermal activation material. In one embodiment of the present application, in the stacked electrode material layers (including electrode material layers 102a, 102b, 102c and 102d), the electrode material layer 102a directly in contact with the electrolyte 110 is regarded as the top electrode material layer 102a of the stacked electrode material layers. Further, the top electrode material layer 102a comprises the thermal activation material. In another embodiment, not only the top electrode material layer 102a comprises the thermal activation material but also at least one of the rests of the stacked electrode material layers comprises the thermal activation material. In the other embodiment, not only the top electrode material layer 102a comprises the thermal activation material but also all of the rest of the stacked electrode material layers comprises the thermal activation material.

The conductive material can be, for example, lithium mixed metal oxide, cobalt mixed metal oxide or lithium-cobalt mixed metal oxide. For instance, the conductive material can be $LiCoO_2$, $LiMn_2O_4$, $LiNi_xCO_yMn_zO_2$ (0<x,y,z<1), $LiNi_xCO_yAl_zO_2$ (0<x,y,z<1), $LiFePO_4$ or the combination thereof.

Moreover, the thermal activation material includes a nitrogen-containing polymer. It should be noticed that the nitrogen-containing polymer includes the nitrogen-containing compound with the number average molecular weight at least 1500 or the nitrogen-containing oligomer with the number average molecular weight about 200~2999. In one embodiment, the thermal activation material includes the nitrogen-containing polymer which can be the hyper branched polymers formed by the reaction between diones and one selected from a group comprising amines, amides, imides, maleimides and imines. More specifically, the diones includes barbituric acid, derivatives of barbituric acid, acetylactone or derivatives of acetylactone. In another embodiment, the thermal activation material includes the nitrogen-containing polymer which can be formed by, for example, the reaction between the bismaleimide and the barbituric acid.

The chemical structure of the aforementioned amine is shown as following:

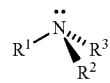

Wherein, $R^1$, $R^2$ and $R^3$ can be as same as or different from each other; each of $R^1$, $R^2$ and $R^3$ can be hydrogen, aliphatic group or aromatic group. More specifically, the amine can be the primary amine in which $R^2$ and $R^3$ are both hydrogen. In one embodiment, the aforementioned amines include 1,1'-bis(methoxycarbonyl)divinylamine (BDA), N-methyl-N,N-divinylamine or divinylphenylamine.

The chemical structure of the aforementioned amide is shown as following:

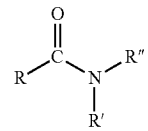

Wherein, R, R' and R" can be as same as or different from each other; each of R, R' and R" can be hydrogen, aliphatic group or aromatic group. More specifically, the amide can be the primary amide in which R' and R" are both hydrogen. In one embodiment, the aforementioned amides include N-Vinylamide, divinylamide, Silyl(vinyl)amides or glyoxylated-vinyl amide.

The chemical structure of the aforementioned imide is shown as following:

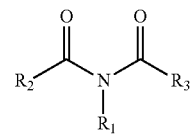

Wherein, $R_1$, $R_2$ and $R_3$ can be as same as or different from each other; each of $R_1$, $R_2$ and $R_3$ can be hydrogen, aliphatic group or aromatic group. In one embodiment, the aforementioned imides include divinylimide such as N-Vinylimide, N-Vinylphthalimide and vinylacetamide.

The maleimides includes monomaleimide, bis-maleimide, tris-maleimide and polymaleimide. The monomer of the aforementioned bis-maleimide comprises chemical structure (I) and chemical structure (II) shown as followings:

chemical structure (I)

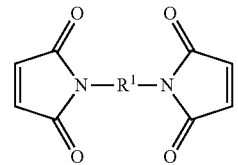

chemical structure (II)

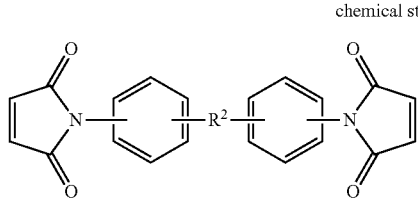

Wherein $R^1$ can be —$RCH_2R$—, —$RNH_2R$—, —$C(O)CH_2$—, —$CH_2OCH_2$—, —$C(O)$—, —$O$—, —$O$—$O$—, —$S$—, —$S$—$S$—, —$S(O)$—, —$CH_2S(O)CH_2$—, —$(O)S(O)$—, —$C_6H_4$—, —$CH_2(C_6H_4)CH_2$—, —$CH_2(C_6H_4)(O)$—, phenylene, biphenylenyl, substituted phenylene or substituted biphenylenyl; $R^2$ can be —$RCH_2$—, —$C(O)$—, —$C(CH_3)_2$—, —$O$—, —$O$—$O$—, —$S$—, —$S$—$S$—, —$(O)S(O)$— or —$S(O)$—, wherein R is $C_1$-$C_6$ alkyl group. Bismaleimide includes N,N'-bismaleimide-4,4'-diphenylmethane, 1,1'-(methylenedi-4,1-phenylene)bismaleimide, N,N'-(1,1'-biphenyl-4,4'-diyl)bismaleimide, N,N'-(4-methyl-1,3-phenylene)bismaleimide, 1,1'-(3,3'dimethyl-1,1'-biphenyl-4,4'-diyl)bismaleimide, N,N'-ethylenedimaleimide, N,N'-(1,2-phenylene)dimaleimide, N,N'-(1,3-phenylene)dimaleimide, N,N'-thiodimaleimid, N,N'-dithiodimaleimid, N,N'-ketonedimaleimid, N,N'-methylene-bis-maleinimid, bis-maleinimidomethyl-ether, 1,2-bis-(maleimido)-1,2-ethandiol, N,N'-4,4'-diphenylether-bis-maleimid and 4,4'-bis(maleimido)-diphenylsulfone.

The chemical structure of the aforementioned imine is shown as following:

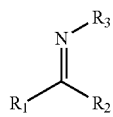

Wherein, $R_1$, $R_2$ and $R_3$ can be as same as or different from each other; each of $R_1$, $R_2$ and $R_3$ can be hydrogen, aliphatic group or aromatic group. The aforementioned imines include divinylimine or allylic imine.

The chemical structures of the barbituric acid and derivatives of barbituric acid are shown as following:

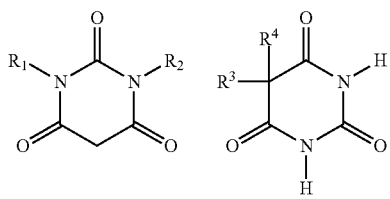

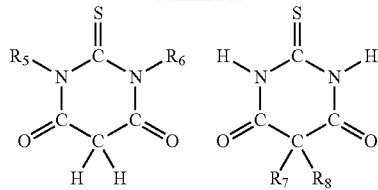

Wherein, $R^1$, $R^2$, $R^3$, $R^4$, $R^5$, $R^6$, $R^7$ and $R^8$ can be as same as or different from each other; each of $R^1$, $R^2$, $R^3$, $R^4$, $R^5$, $R^6$, $R^7$ and $R^8$ can be H, $CH_3$, $C_2H_5$, $C_6H_5$, $CH(CH_3)_2$, $CH_2CH(CH_3)_2$, $CH_2CH_2CH(CH_3)_2$ or

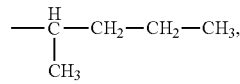

wherein, while the compound is the barbituric acid, $R^1$, $R^2$, $R^3$ and $R^4$ are all hydrogen.

The chemical structures of the acetylactone and derivatives of acetylactone are shown as following:

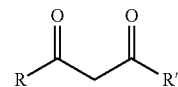

Wherein, each of R and R' can be aliphatic group, aromatic group or heterocyclic group. Also, while both of R and R' are methyl groups, the compound is acetylactone.

The mole ratio of the required amount of diones to the monomer of amines, amides, imides, maleimides or imines is about 1:20~4:1. Preferably, the mole ratio is about 1:5~2:1. More preferably, the mole ratio is about 1:3~1:1.

It should be noticed that the thermal activation material is micromolecule material before the thermal activation. Therefore, the diffusion of the lithium ions in the lithium battery does not affected by the thermal activation material. Once the temperature of the lithium battery increases, a cross-linking reaction of the thermal activation material is initiated and the thermal activation material is converted into the polymer so that the diffusion of the lithium ions is retarded and the conductivity of the electrolyte decreases. On other words, when the temperature of the lithium battery increases, the terminal groups of the thermal activation material 404 perform the cross-linking reaction to block the diffusion of the lithium ions. Thus, the release of the oxygen molecules from the heated plate can be suppressed and the exothermic reactions between the plates of the lithium battery and the electrolyte can be inhibited. Hence, the safety of the lithium battery is increased. The temperature of the cross-linking reaction of the thermal activation material is the onset temperature. For instance, when the nitrogen-containing polymer is formed by the reaction between bismaleimide and barbituric acid, the terminal groups of the thermal activation material comprises ethenyl group (from bismaleimide) and amino group (from barbituric acid). When the temperature of the battery increases, the temperature of the cross-linking reaction of the ethenyl group with the amino group is the thermal activation temperature. In the present application, the thermal activation temperature is about 80~280° C. Preferably, the thermal activation temperature is about 100~220° C. More preferably, the thermal activation temperature is about 130~200° C.

Generally, the conductive material doped with polymer material leads to the decreasing of the conductivity of the conductive material. Hence, according to the content of the thermal activation material in each electrode material layer, the electrode material layers can be classified into high conductive material layer with small content of thermal activation material and high secure material layer with large content of thermal activation material. In one embodiment of the present application, in order to balance the conductivity and the safety of the plates of the battery, the contents of the electrode material layers in the positive electrode plate 102 are different from each other. Preferably, the more close to the negative electrode plate 104 the electrode material layer (such as the electrode material layer 102a, 102b, 102c or 102d) is, the larger content of the thermal activation material the electrode material layer has. On the other words, from the top electrode material layer 102a to the bottom electrode material layer 102d, the contents of the thermal activation material in the electrode material layers 102a, 102b, 102c and 102d gradually decreases. That is, opposite to the bottom electrode material layer 102d belonging to the high conductive material layer, the top electrode material layer 102a belongs to the high secure material layer. The weight percentage of the thermal activation material in the thermal insulating layer is about 0.1~40 wt %. Preferably, the weight percentage of the thermal activation material in the thermal insulating layer is about 1.0~2.5 wt %.

In another embodiment, when the amounts of the thermal activation material in the electrode material layers (such as the electrode material layers 102a, 102b, 102c and 102d) are the same as each other, the conductivites of the electrode material layers (102a, 102b, 102c and 102d) from the top electrode material layer to the bottom electrode material layer gradually increase by adjusting the component compositions of the conductive materials in the electrode material layers to be different from each other.

Figure 2:
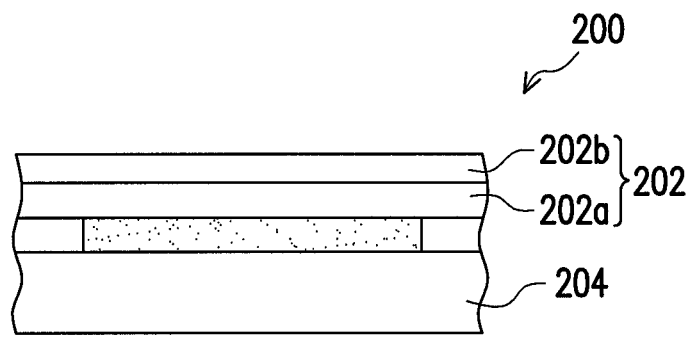
FIG. 2 is a partial enlargement view of a cross-section of a lithium battery according to another embodiment of the present application.

FIG. 2 is a schematic cross-sectional view of a portion of a lithium battery according to one embodiment of the present application. As shown in FIG. 2, in one embodiment, when the positive electrode plate 202 comprises the top electrode material layer 202a, close to the negative electrode plate 204, and the bottom electrode material layer 202b, away from the negative electrode plate 204, the ratio of the thickness of the top electrode material layer 202a to the thickness of the bottom electrode material layer 202b is about 10/90~90/10.

Figure 3:
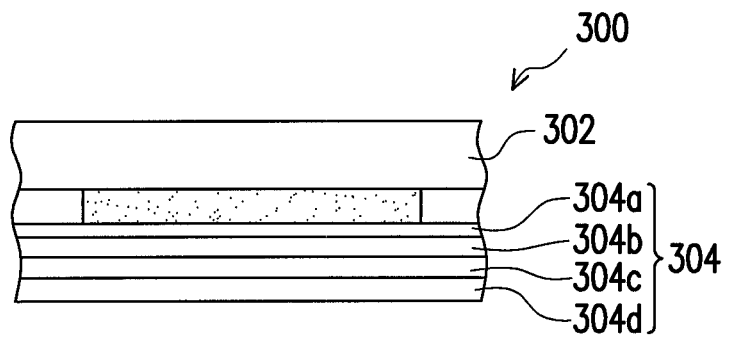
FIG. 3 is a partial enlargement view of a cross-section of a lithium battery according to the other embodiment of the present application.

In the aforementioned embodiment, the first plate 102 and the second plate 104 of the lithium battery 100 are the positive electrode plate and the negative electrode plate respectively and the first plate 102 (positive electrode plate) is formed by a plurality of electrode material layers stacked on one another. At least one of the electrode material layers comprises a thermal activation material. However, the aforementioned arrangement does not limit the scope of the present application. As shown in FIG. 3 which is a partial enlargement view of a cross-section of a lithium battery according to the other embodiment of the present application, the first plate 302 and the second plate 304 of the lithium battery 300 are the positive electrode plate and the negative electrode plate respectively and the second plate 304 (negative electrode plate) is formed by a plurality of electrode material layers (such as the electrode material layers 304a, 304b, 304c and 304d) stacked on one another. Each of the electrode material layers is made of the conductive material and at least one of the electrode material layers comprises a thermal activation material. The negative electrode plate 304 having a plurality of electrode material layer stacked one another can be formed by slot die coating, slide coating or curtain coating. The conductive material in the electrode material layers of the negative electrode plate 304 is as same as the material of the negative electrode plate 104 mentioned above and is not described herein. The conductive material in the electrode material layers of the positive electrode plate 302 is as same as the material of the positive electrode plate 102 mentioned above and is not described herein.

Figure 4:
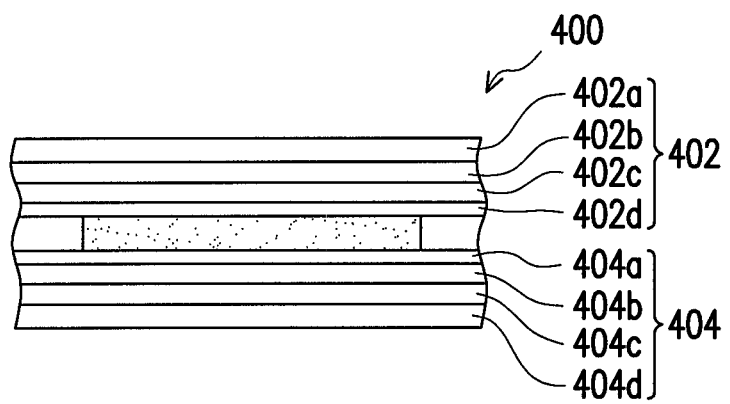
FIG. 4 is a partial enlargement view of a cross-section of a lithium battery according to one embodiment of the present application.

FIG. 4 is a partial enlargement view of a cross-section of a lithium battery according to one embodiment of the present application. As shown in FIG. 4, the first plate 402 and the second plate 404 of the lithium battery 400 are the positive electrode and the negative electrode respectively and the first plate 402 (positive electrode) and the second plate 404 (negative electrode) are formed by a plurality of electrode material layers (such as the positive electrode plate 402 made from the electrode material layers 402a, 402b, 402c and 402d and the negative electrode plate 404 made from the electrode material layers 404a, 404b, 404c and 404d) stacked on one another. Further, at least one of the stacked electrode material layers for forming the positive electrode plate 402 comprises a thermal activation material, and at least one of the stacked electrode material layers for forming the negative electrode plate 404 comprises a thermal activation material. The electrode materials for forming the positive electrode plate 402 and the negative electrode plate 404 are as same as the materials mentioned in the above embodiments and are not described herein. The methods for forming the positive electrode plate 402 and the negative electrode plate 404 in stacked-electrode-material-layer structures respectively are as same as the methods mentioned in the above embodiments and are not described herein.

Table 1 shows the numbers of the electrode layers of different positive electrode plates, the contents of the thermal activation material in the positive electrode plates and the reaction heat generated by the corresponding positive electrode plates.

TABLE 1

| No. | Number of Layers | Contents (wt %) | Thickness Ratio | Reaction Heat (J/g) |
|---|---|---|---|---|
| 1 | 1 | 0 | — | 880 |
| 2 | 1 | 2 | — | 763 |
| 3 | 2 | 2/0 | 51/49 | 656 |

For each of the positive electrode plates, the conductive material in each of the electrode material layers is the mixture of $LiMn_xCO_yNi_zO_2$ and $LiMn_2O_4$. According to the experiment 1 and the experiment 2, when the number of the electrode material layers is one, the reaction heat generated by the positive electrode plate of which the electrode material layer contains the thermal activation material is smaller than the reaction heat generated by the positive electrode plate of which the electrode material layer does not contain any thermal activation material. According to the experiment 2 and the experiment 3, the reaction heat (656 J/g) generated by the positive electrode plate formed by two electrode material layer (the top electrode material layer with containing the thermal activation material (2 wt %) therein and the bottom electrode material layer without containing the thermal activation material therein) is smaller than the reaction heat generated by the positive electrode plate formed by only one electrode material layer with the thermal activation material therein. Apparently, although the total amount of the thermal activation material of the positive electrode plate in the experiment 3 is smaller than the total amount of the thermal activation material of the positive electrode plate in the experiment 2, the reaction heat generated by the positive electrode plate of experiment 3 is smaller than the reaction heat generated by the positive electrode plate of experiment 2. That is, by comparing with the positive electrode plate formed by single electrode material layer having the thermal activation material, the positive electrode plate formed by multi-layers of electrode material having the thermal activation material has a better performance on suppressing the generation of the reaction heat.

Table 2 shows positive electrode plates formed by two layers of electrode material, the temperatures of the positive electrodes and negative electrodes after the lithium batteries are charged. In the experiment 4, only bottom electrode material layer in the positive electrode plate contains the thermal activation material. In the experiment 5, only top electrode material layer in the positive electrode plate contains the thermal activation material.

TABLE 2

| No. | Number of Layers | Contents of Thermal Activation Material (wt %) | Temperature of positive electrode (° C.) | Temperature of negative electrode (° C.) |
|---|---|---|---|---|
| 4 | 2 | 0/1 | 170 | 166 |
| 5 | 2 | 1/0 | 96 | 115 |

For each of the positive electrode plates, the conductive material in each of the electrode material layers is the mixture of $LiNi_xCo_yMn_zO_2$ and $LiMn_2O_4$. Apparently, while the lithium batteries are charged, the temperatures of the positive electrode plate and the negative electrode plate of the positive electrode plate with the top electrode material layer containing the thermal activation material are smaller than those of the positive electrode plate with the bottom electrode material layer containing the thermal activation material. That is, for the positive electrode plates respectively comprising two layers of electrode material, the one with the top electrode material layer having the thermal activation material is much safer than the one with the bottom electrode material layer having the thermal activation material.

In the present application, the electrode plate is formed by a plurality of electrode material layers and at least one of the electrode material layers comprises a thermal activation material.

When the temperature of the lithium battery increases, the thermal activation material is activated to perform the cross-linking reaction to block the diffusion of the lithium ions. Hence, the conductivity of the electrolyte decreases. Further, the release of the oxygen molecules from the heated plate can be suppressed and the exothermic reactions between the positive electrode plates and the electrolyte can be inhibited. Hence, the safety of the lithium battery is increased.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A lithium battery, comprising:
   a first plate formed by a plurality of first electrode material layers stacked on one another, wherein at least one of the plurality of first electrode material layers comprises a thermal activation material doped therein, wherein the thermal activation material comprises a nitrogen-containing polymer which is formed by a reaction between diones and one selected from amines, amides, imides, maleimides or imines;
   a second plate, wherein the plurality of first electrode material layers comprises a top electrode material layer close to the second plate and a bottom electrode material layer away from the second plate; and
   a separator located between the first plate and the second plate, and wherein contents of the thermal activation material doped in the plurality of first electrode material layers increase gradually from the bottom electrode material layer to the top electrode material layer of the plurality of electrode material layers.

2. The lithium battery of claim 1, wherein a content of the thermal activation material in each of the plurality of first electrode material layers is about 0.1~10 wt %.

3. The lithium battery of claim 1, wherein a content of the thermal activation material in each of the plurality of first electrode material layers is about 1.0~2.5 wt %.

4. The lithium battery of claim 1, wherein the nitrogen-containing polymer is formed by a reaction between bismaleimide monomers and barbituric acid.

5. The lithium battery of claim 1, wherein the diones includes barbituric acid, derivatives of barbituric acid, acetylactone or derivatives of acetylactone.

6. The lithium battery of claim 1, wherein when the first plate is an positive electrode plate, a conductive material of each of the first electrode material layers is selected from a group comprising $LiCoO_2$, $LiMn_2O_4$, $LiNi_xCo_yMn_zO_2$ (0<x, y,z<1) and $LiNi_xCo_yAl_zO_2$ (0<x,y,z<1) and $LiFePO_4$.

7. The lithium battery of claim 1, wherein a ratio of the thickness of the top electrode material layer to a thickness of the bottom electrode material layer is about 10/90~90/10.

8. The lithium battery of claim 1, wherein when the first plate is a positive electrode, the second plate is an negative electrode, and when the first plate is an negative electrode, the second plate is an positive electrode.

9. The lithium battery of claim 1, wherein the second electrode plate is formed by a plurality of second electrode material layers stacked on one another, and at least one of the plurality of second electrode material layers comprises a thermal activation material.

10. An electrode plate structure, comprising:
    a plurality of electrode material layers stacked on one another, wherein at least one of the plurality of electrode material layers comprises a thermal activation material doped therein, wherein the thermal activation material comprises a nitrogen-containing polymer which is formed by a reaction between diones and one selected from amines, amides, imides, maleimides or imines, and wherein the plurality of electrode material layers comprises a bottom electrode material layer and a top electrode material layer stacked on the bottom electrode layer, and contents of the thermal activation material doped in the plurality of electrode material layers gradually increase from the bottom electrode material layer to the top electrode material layer of the plurality of electrode material layers.

11. The electrode plate structure of claim 10, wherein the content of the thermal activation material in each of the plurality of electrode material layers is about 0.1~10 wt %.

12. The electrode plate structure of claim 10, wherein the content of the thermal activation material in each of the plurality of electrode material layers is about 1.0~2.5 wt %.

13. The electrode plate structure of claim 10, wherein a ratio of the thickness of the top electrode material layer to a thickness of the bottom electrode material layer is about 10/90~90/10.

14. The electrode plate structure of claim 10, wherein the nitrogen-containing polymer is formed by a reaction between bismaleimide monomers and barbituric acid.

15. The electrode plate structure of claim 10, wherein the diones includes barbituric acid, derivatives of barbituric acid, acetylactone or derivatives of acetylactone.

16. The electrode plate structure of claim 10, wherein when the stacked electrode material layers are used as a positive electrode plate, a conductive material of each of the electrode material layers is selected from a group comprising $LiCoO_2$, $LiMn_2O_4$, $LiNi_xCo_yMn_zO_2$ ($0<x,y,z<1$) and $LiNi_xCo_yAl_zO_2$ ($0<x,y,z<1$) and $LiFePO_4$.

\* \* \* \* \*